United States Patent
Harikumar et al.

(10) Patent No.: US 8,635,380 B2
(45) Date of Patent: Jan. 21, 2014

(54) METHOD, SYSTEM AND APPARATUS FOR HANDLING EVENTS FOR PARTITIONS IN A SOCKET WITH SUB-SOCKET PARTITIONING

(75) Inventors: Ajay Harikumar, Bangalore (IN); Tessil Thomas, Karnataka (IN); Biju Puthur Simon, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1469 days.

(21) Appl. No.: 12/291,272

(22) Filed: Nov. 7, 2008

(65) Prior Publication Data

US 2009/0164739 A1   Jun. 25, 2009

(30) Foreign Application Priority Data

Dec. 20, 2007   (IN) .......................... 2677/DEL/2007

(51) Int. Cl.
G06F 13/10   (2006.01)
G06F 11/00   (2006.01)

(52) U.S. Cl.
USPC .............................................. 710/18; 714/26

(58) Field of Classification Search
USPC ............................................................ 710/18
See application file for complete search history.

(56) References Cited

U.S. PATENT DOCUMENTS

| | | | |
|---|---|---|---|
| 4,625,274 A * | 11/1986 | Schroeder .......................... 713/1 |
| 5,721,876 A * | 2/1998 | Yu et al. .......................... 703/27 |
| 6,199,179 B1 * | 3/2001 | Kauffman et al. ............... 714/26 |
| 6,535,578 B1 * | 3/2003 | Hiltunen ........................... 379/9 |
| 6,633,967 B1 | 10/2003 | Duncan | |
| 7,260,635 B2 | 8/2007 | Pandya | |
| 7,558,271 B2 | 7/2009 | Elliot | |
| 7,685,354 B1 * | 3/2010 | Hetherington et al. ........... 711/5 |
| 7,721,148 B2 | 5/2010 | Brenden et al. | |
| 7,725,559 B2 | 5/2010 | Landis | |
| 7,853,755 B1 | 12/2010 | Agarwal et al. | |
| 2005/0055504 A1 * | 3/2005 | Hass et al. .................... 711/122 |
| 2005/0165932 A1 * | 7/2005 | Banerjee et al. .............. 709/226 |
| 2007/0038809 A1 | 2/2007 | Accapadi et al. | |
| 2008/0134191 A1 | 6/2008 | Warrier et al. | |
| 2009/0164730 A1 | 6/2009 | Harikumar et al. | |
| 2009/0164747 A1 | 6/2009 | Harikumar et al. | |
| 2009/0164751 A1 | 6/2009 | Harikumar et al. | |
| 2011/0055488 A1 | 3/2011 | Vishin | |
| 2011/0055827 A1 | 3/2011 | Lin et al. | |

OTHER PUBLICATIONS

U.S. Patent and Trademark Office, Office Action mailed Feb. 29, 2012 and Reply to Office Action filed on May 29, 2012, in U.S. Appl. No. 12/291,273.
U.S. Patent and Trademark Office, Office Action mailed Jul. 26, 2011, with Reply filed Oct. 19, 2011 in U.S. Appl. No. 12/291,303.
U.S. Patent and Trademark Office, Office Action mailed Jun. 29, 2012, with Reply filed Sep. 25, 2012 in U.S. Appl. No. 12/291,306.

* cited by examiner

*Primary Examiner* — Titus Wong
(74) *Attorney, Agent, or Firm* — Trop, Pruner & Hu, P.C.

(57) ABSTRACT

In one aspect, the issues of events that may impact one or more partitions of sub-socket partitioning in one or more sockets can be handled. Specifically, events for partitions can be handled in a socket with sub-socket partitioning, wherein the events may include reset, interrupts, errors and reliability, availability, and serviceability (RAS) management.

13 Claims, 6 Drawing Sheets

METHOD, SYSTEM AND APPARATUS FOR HANDLING EVENTS FOR PARTITIONS IN A SOCKET WITH SUB-SOCKET PARTITIONING

CROSS-REFERENCE TO RELATED APPLICATION

Pursuant to 35 U.S.C. §119, this application claims priority to Indian Application Serial No. 2677/DEL/2007, filed Dec. 20, 2007, the subject matter of which is incorporated herein by reference.

The present application is related to and may incorporate embodiments from three concurrently filed applications by the same set of inventors. The first application, is titled "METHOD, APPARATUS, AND SYSTEM FOR SHARED CACHE USAGE TO DIFFERENT PARTITIONS IN A SOCKET WITH SUB-SOCKET PARTITIONING", Ser. No. 12/291,273, filed Nov. 7, 2008, now U.S. Pat. No. 8,296,522, issued Oct. 23, 2012. The second application, is titled "METHOD, SYSTEM AND APPARATUS FOR MAIN MEMORY ACCESS SUBSYSTEM USAGE TO DIFFERENT PARTITIONS IN A SOCKET WITH SUB-SOCKET PARTITIONING", Ser. No. 12/291,306, filed Nov. 7, 2008, now U.S. Pat. No. 8,370,508, issued Feb. 5, 2013. The third application, is titled "METHOD, SYSTEM, AND APPARATUS FOR MEMORY ADDRESS MAPPING SCHEME FOR SUB-SOCKET PARTITIONING", Ser. No. 12/291,303, filed Nov. 7, 2008, now U.S. Pat. No. 8,151,081, issued Apr. 3, 2012.

BACKGROUND

Embodiments of the invention relate to the field of partitioning, and according to one embodiment, a method and apparatus, and system for handling events for partitions in a socket with sub-socket partitioning, wherein the events may include reset, interrupts, errors and reliability, availability, and serviceability (RAS) management.

As modern microprocessors become increasingly faster with growing number of cores, it becomes feasible from a performance viewpoint to run multiple operating systems on the same hardware. This ability opens up many possibilities including Server consolidation and ability to run services Operating Systems in parallel to the main Operating System. Providing this ability can be done either in software or in hardware. In software it is done using virtualization mechanisms by running a Virtual Machine Monitor (VMM) underneath the Operating Systems. However, the present software schemes adversely impact performance for handling system events. The present partitioning hardware schemes partition only down to a socket granularity, hence, this precludes partitioning down to a particular core within the processor or socket.

BRIEF DESCRIPTION OF THE DRAWINGS

The invention may best be understood by referring to the following description and accompanying drawings that are used to illustrate embodiments of the invention.

DETAILED DESCRIPTION

Figure 1:
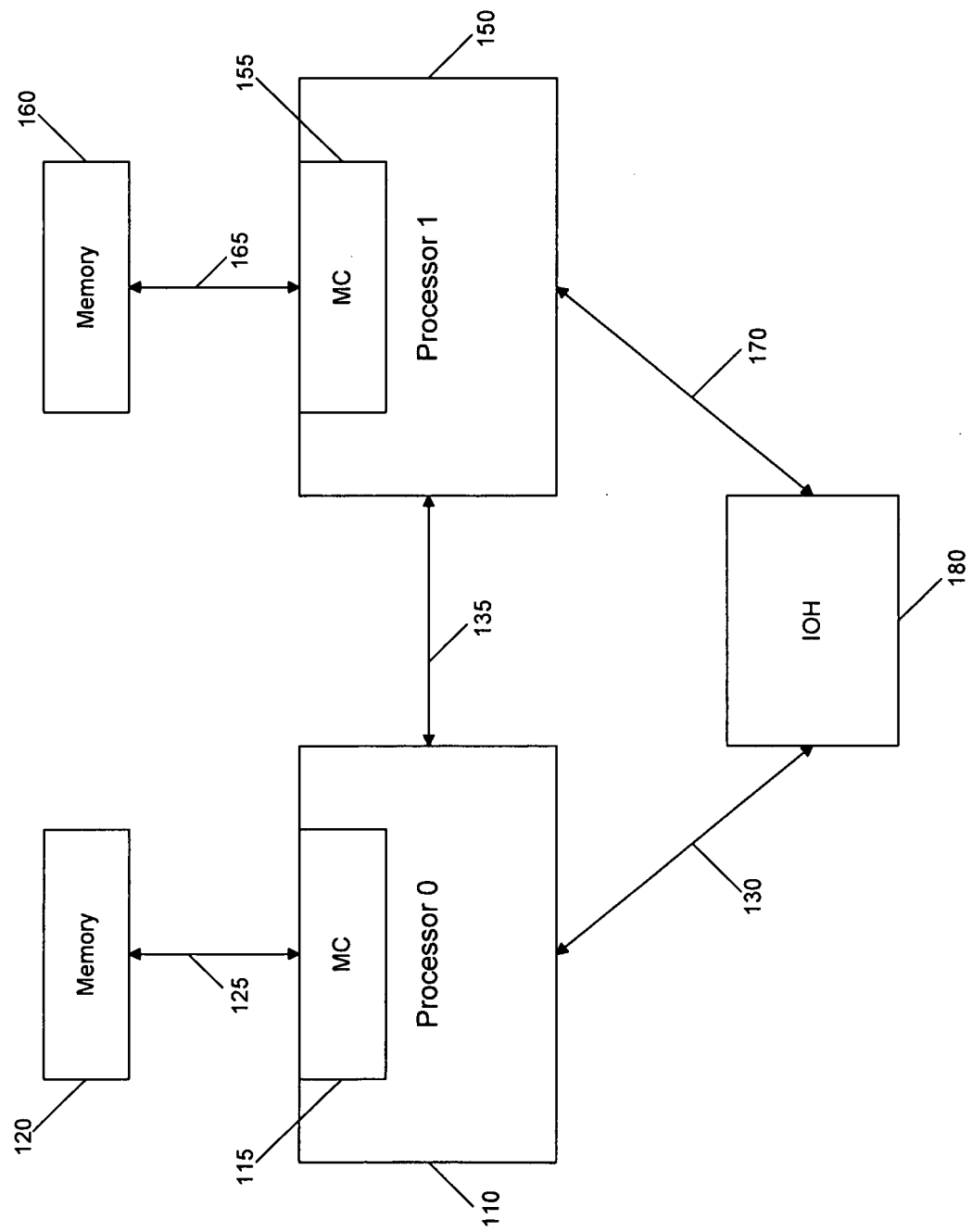
FIG. 1 is an exemplary block diagram of a dual processor system in accordance with an embodiment of the invention.

In one embodiment, at least two different operating systems may operate within each socket, such that, one or more cores are running different operating systems. Hence, "sub-socket partitioning" allows multiple partitions to utilize different operating systems within each socket. The claimed subject matter facilitates handling and isolating events to a partition, wherein the events could include reset, interrupts, errors and reliability, availability, and serviceability (RAS) management.

In the following description, certain terminology is used to describe features of embodiments of the invention. For example, the term "device" or "agent" is general and may be used to describe any electrical component coupled to a link. A "link or interconnect" is generally defined as an information-carrying medium that establishes a communication pathway for messages, namely information placed in a predetermined format. The link or interconnect may be a wired physical medium (e.g., a bus, one or more electrical wires, trace, cable, etc.) or a wireless medium (e.g., air in combination with wireless signaling technology).

The term "home agent" is broadly defined as a device that provides resources for a caching agent to access memory and, based on requests from the caching agents, can resolve conflicts, maintain ordering and the like. The home agent includes a tracker and data buffer(s) for each caching agent as described below. A "tracker" is dedicated storage for memory requests from a particular device. For instance, a first tracker may include a plurality of entries associated with a first caching agent while a second tracker may include other entries associated with a second caching agent. According to one embodiment of the invention, the "caching agent" is generally a cache controller that is adapted to route memory requests to the home agent.

The term "logic" is generally defined as hardware and/or software that perform one or more operations such as controlling the exchange of messages between devices. When deployed in software, such software may be executable code such as an application, a routine or even one or more instructions. Software may be stored in any type of memory, normally suitable storage medium such as (i) any type of disk including floppy disks, magneto-optical disks and optical disks such as compact disk read-only memories (CD-ROMs), compact disk rewritables (CD-RWs), digital versatile disks (DVDs), (ii) any type of semiconductor devices such as read-only memories (ROMs), random access memories (RAMs), erasable programmable read-only memories (EPROMs), flash memories, electrically erasable programmable read-only memories (EEPROMs), (iii) magnetic or optical cards, or (iv) any other type of media suitable for storing electronic instructions.

In the following description, numerous specific details are set forth. However, it is understood that embodiments of the invention may be practiced without these specific details. In other instances, well-known circuits, structures and techniques have not been shown in detail in order not to obscure the understanding of this description.

Referring to FIG. 1, an exemplary block diagram of a system in accordance with one embodiment of the invention is shown. Herein, FIG. 1 depicts a dual processor (DP) configuration with processors 110 and 150. For instance, this configuration may be associated with a desktop or mobile computer, a server, a set-top box, personal digital assistant (PDA), alphanumeric pager, cellular telephone, or any other type of wired or wireless communication devices.

Each processor 110 and 150 includes a memory controller (MC) 115 and 155 to enable direct communications with an associated memory 120 and 160 via links 125 and 165, respectively. Moreover, the memories 120 and 160 may be independent memories or portions of the same shared memory.

As specifically shown in FIG. 1, processors 110 and 150 are coupled to an input/output hub (IOH) 180 via point-to-point links 130 and 170, respectively. IOH 180 provides connectivity between processors 110 and 150 and input/output (I/O) devices implemented within DP system 100. In addition, processors 110 and 150 are coupled to each other via a point-to-point link 135. According to one embodiment of the invention, these point-to-point links 130, 135, 170 may be adapted to operate in accordance with "Quickpath" specification developed by Intel Corporation of Santa Clara, Calif. However, the claimed subject matter is not limited to a Quickpath link and may utilize any type of link or interconnect. One skilled in the art appreciates the utilization of any link or interconnect scheme that is customized for the particular design requirements. For example, one may use any coherent or non coherent link or interconnect protocol, such as, but not limited to Peripheral Component Interconnect (PCI, PCIe, etc.), a front side bus (FSB), etc.

Figure 2:
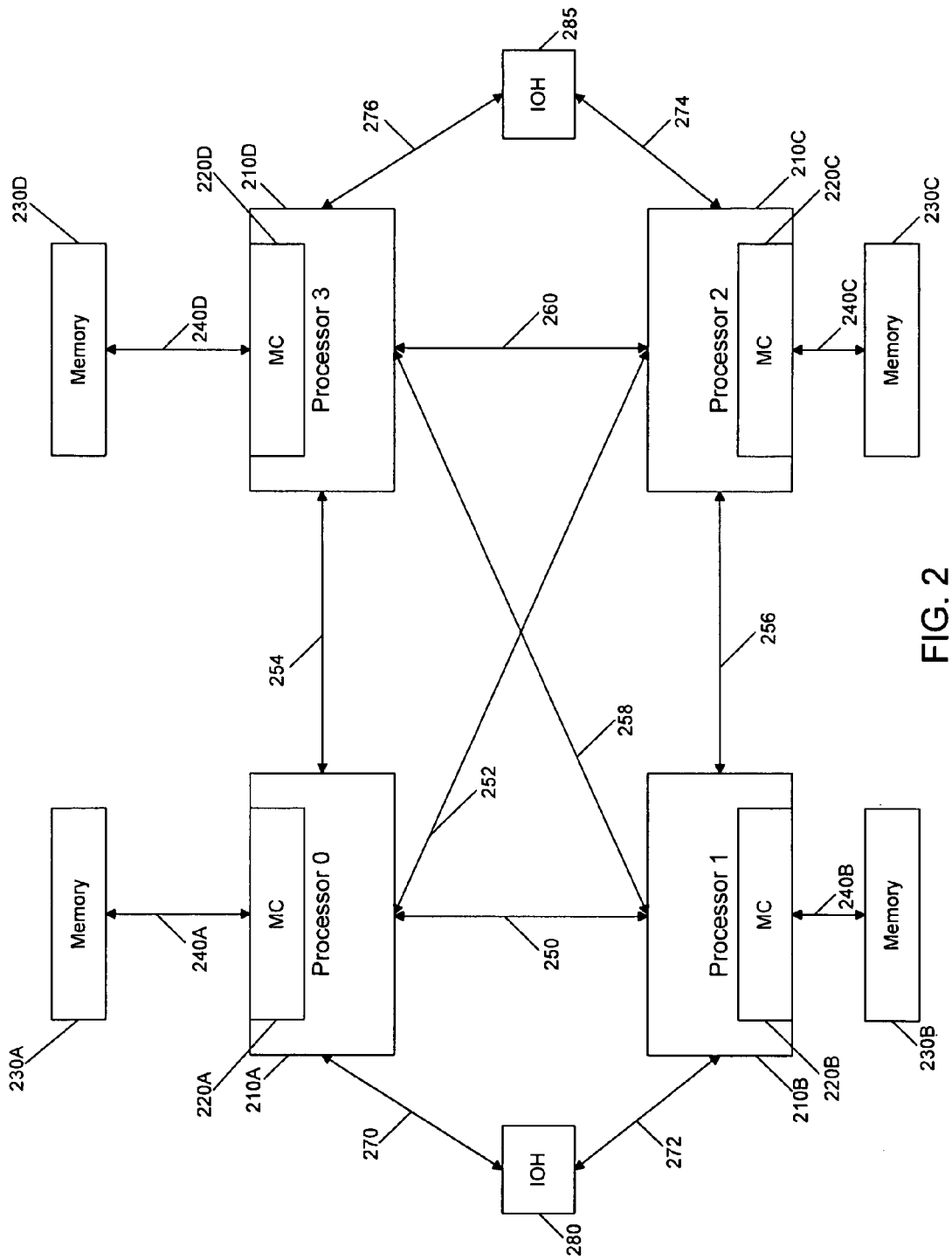
FIG. 2 is an exemplary block diagram of a multi-processor system in accordance with an embodiment of the invention.

Referring now to FIG. 2, an exemplary block diagram of a multiprocessor (MP) system in accordance with one embodiment of the invention is shown. Similarly, MP system may be a desktop or mobile computer, a server, a set-top box, personal digital assistant (PDA), alphanumeric pager, cellular telephone, or any other type of wired or wireless communication devices.

Herein, according to one embodiment of the invention, MP system comprises a plurality of processors 210A-210D. One or more of processors, such as processors 210A-210D, may include a memory controller (MC) 220A-220D. These memory controllers 220A-220D enable direct communications with associated memories 230A-230D via links 240A-240D, respectively. In particular, as shown in FIG. 2, processor 210A is coupled to memory 230A via a link 240A while processors 210B-210D are coupled to corresponding memories 230B-230D via links 240B-240D, respectively.

Additionally, processor 210A is coupled to each of the other processors 210B-210D via pTp (point-to-point) links 250, 252 and 254. Similarly, processor 210B is coupled to processors 210A, 210C and 210D via pTp links 250, 256 and 258. Processor 210C is coupled to processors 210A, 210B and 210D via pTp links 252, 256 and 260. Processor 210D is coupled to processors 210A, 210B and 210C via pTp links 254, 258 and 260. Processors 210A and 210B are coupled via pTp interconnects 270 and 272 to a first input/output hub (IOH) 280 while processors 210C and 210D are coupled via point-to-point interconnects 274 and 276 to a second IOH 285.

For both systems 100 and 200 described in FIGS. 1 and 2, it is contemplated that the processors may be adapted to operate as a home agent, a caching agent or both, depending on the system architecture selected.

Figure 3:
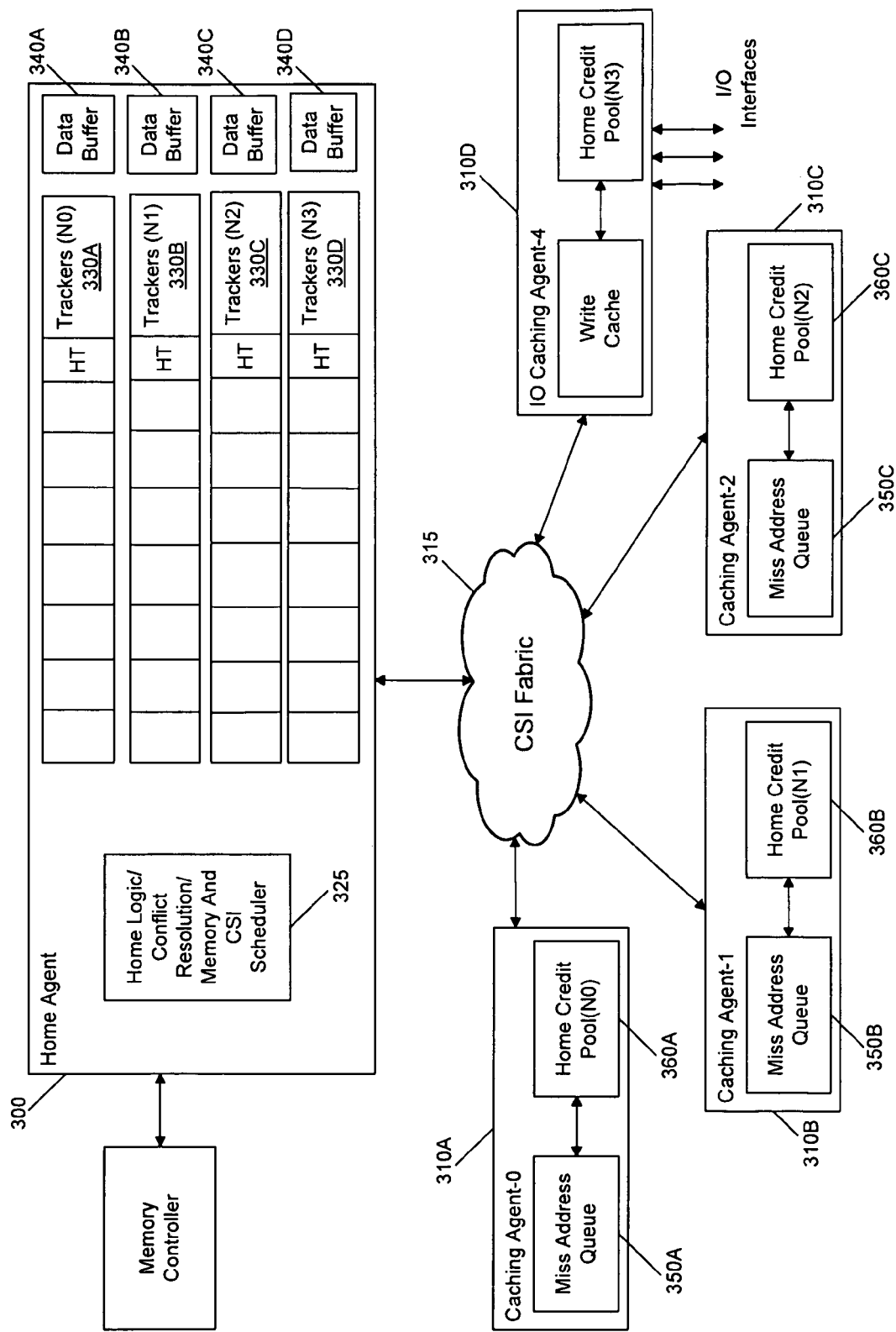
FIG. 3 is an exemplary embodiment of architectures for home and caching agents of the systems of FIGS. 1-2 in accordance with an embodiment of the invention.

Referring now to FIG. 3, an exemplary embodiment of architectures for destination and source devices of the systems of FIGS. 1-2 in accordance with an embodiment of the invention is shown. For illustrative purposes, processor 210D from FIG. 2 (or processor 150 from FIG. 1) is configured as a destination device 300, such as a home agent for example. Processors 210A-210C from FIG. 2 (or processor 110 from FIG. 1) could be configured as sources 310A-310C, such as caching agents for example. IOH 280 or 285 (or IOH 180 of FIG. 1) may be configured as I/O device 310D implementing a write cache 320 operates as a caching agent as well.

As described below, each source 310A, . . . , or 310D is associated with a tracker that is maintained at destination device 300 and has a predetermined number of tracker entries. The number of tracker entries is limited in size to the number of requests that may be transmitted by any source 310A, . . . , or 310D that saturates the bandwidth of a PTP fabric 315, which supports point-to-point communications between destination 300 and the plurality of sources (e.g., sources 310A-310D).

As shown in FIG. 3, according to this embodiment of the invention, destination 300 is a home agent that comprises home logic 325 and a plurality of trackers 3301 . . . 330M, where M≥1. In combination with trackers 3301 . . . 330M, home logic 325 is adapted to operate as a scheduler to assist in the data transfer of incoming information from memory 230A of FIG. 2 and outgoing information to PTP fabric 315. Moreover, home logic 325 operates to resolve conflicts between these data transfers.

Herein, for this embodiment of the invention, since four (4) caching agents 310A-310D are implemented within system 100/200, four (M=4) trackers are illustrated and labeled "HT-0" 330A, "HT-1" 330B, "HT-2" 330C and "HT-3" 330D. These trackers 330A-330D each contain N0, N1, N2 and N3 tracker entries respectively, where N1≥1 (i=1, 2, 3 or 4). The number of entries (N0-N3) may differ from one tracker to another. Associated with each entry of trackers 330A-330D is a corresponding data buffer represented by data buffers 340A-340D. Data buffers 340A-340D provide temporary storage for data returned from memory controller 220A, and eventually scheduled onto PTP fabric 315 for transmission to a targeted destination. The activation and deactivation of the entries for trackers 330A-330D is controlled by home logic 325 described below.

Caching agents 310A, 310B, and 310C include a miss address queue 350A, 350B, and 350C, respectively. For instance, with respect to caching agent 310A, miss address queue 350A is configured to store all of the miss transactions that are handled by home agent 300.

In addition, according to this embodiment of the invention, caching agents 310A, 310B and 310C further include a credit counter 360A, 360B and 360C, respectively. Each credit counter 360A, 360B, and 360C maintains a count value representative of the number of unused tracker entries in trackers 330A, 330B, and 330C. For instance, when a new transaction is issued by caching agent 310A to home agent 300, credit counter 360A is decremented. If a transaction completes, then credit counter. 360A is incremented. At reset time, credit counter 360A is initialized to the pool size equal to the number of tracker entries (N0) associated with tracker 330A. The same configuration is applicable to credit counters 360B-360C.

Also shown in FIG. 3 is an example of caching agent 310D operating as an I/O agent that reads information from memory and writes information to an I/O interface. Alternately, caching agent 310D may stream I/O agent read returns as writes into the main memory. Caching agent 310D implements write cache 320, which is used to sustain high bandwidth while storing data associated with I/O operations.

Figure 4:
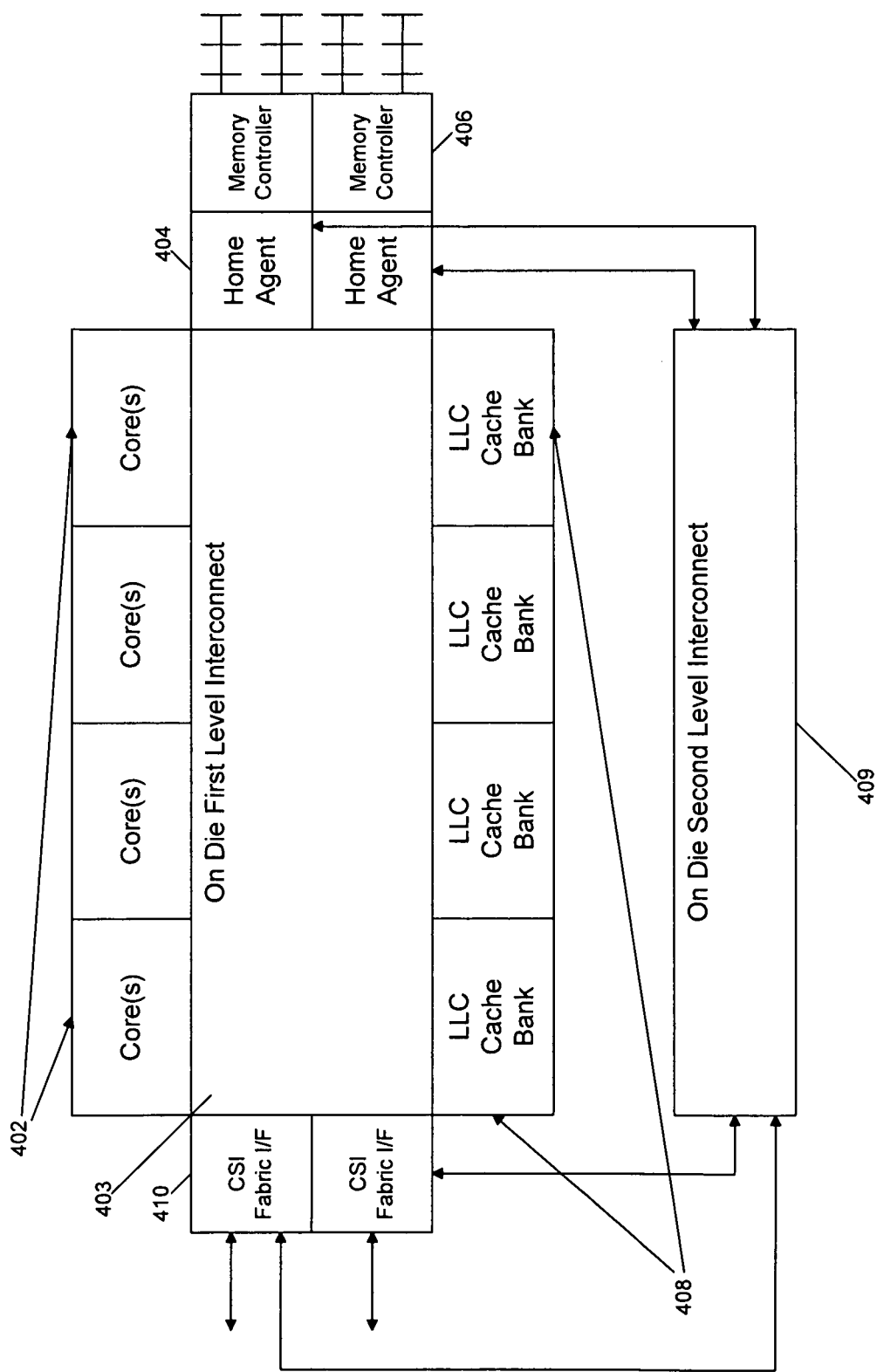
FIG. 4 is a socket architecture in accordance with an embodiment of the invention.

FIG. 4 is a socket architecture in accordance with an embodiment of the invention. In one embodiment, a dual processor system as depicted in the previous figures with each processor socket having processor cores 402. In one embodiment, at least two different operating systems may operate within each socket, such that, one or more cores are running different operating systems. In this embodiment, a partition identifier is assigned to each partition. The cores and the distributed LLC (Last Level Cache banks) 408 are connected to each other within the socket by a first level interconnect 403. In one embodiment, the first level interconnect 403 is an on-die ring interconnect. In anther embodiment, the first level interconnect is a two dimensional mesh/cross bar. The memory controller 406 is integrated into the processor die and a pTp protocol is used for inter-processor communication and IO access. The fabric interfaces 410 and the home agent 404 are also connected to the first level interconnect. The home agents 404 and the fabric interfaces 410 are connected to each other via a second level interconnect 409. In summary, in one embodiment, the first level interconnect may be used to connect the cache memory, home agents and the off chip links to the processor cores, and the second level interconnects are used for connecting the home agent directly to the off chip links. However, the claimed subject matter is not limited to the previous configuration. One skilled in the art appreciates utilizing different configurations to facilitate communication for a particular application or power management scheme.

Figure 5:
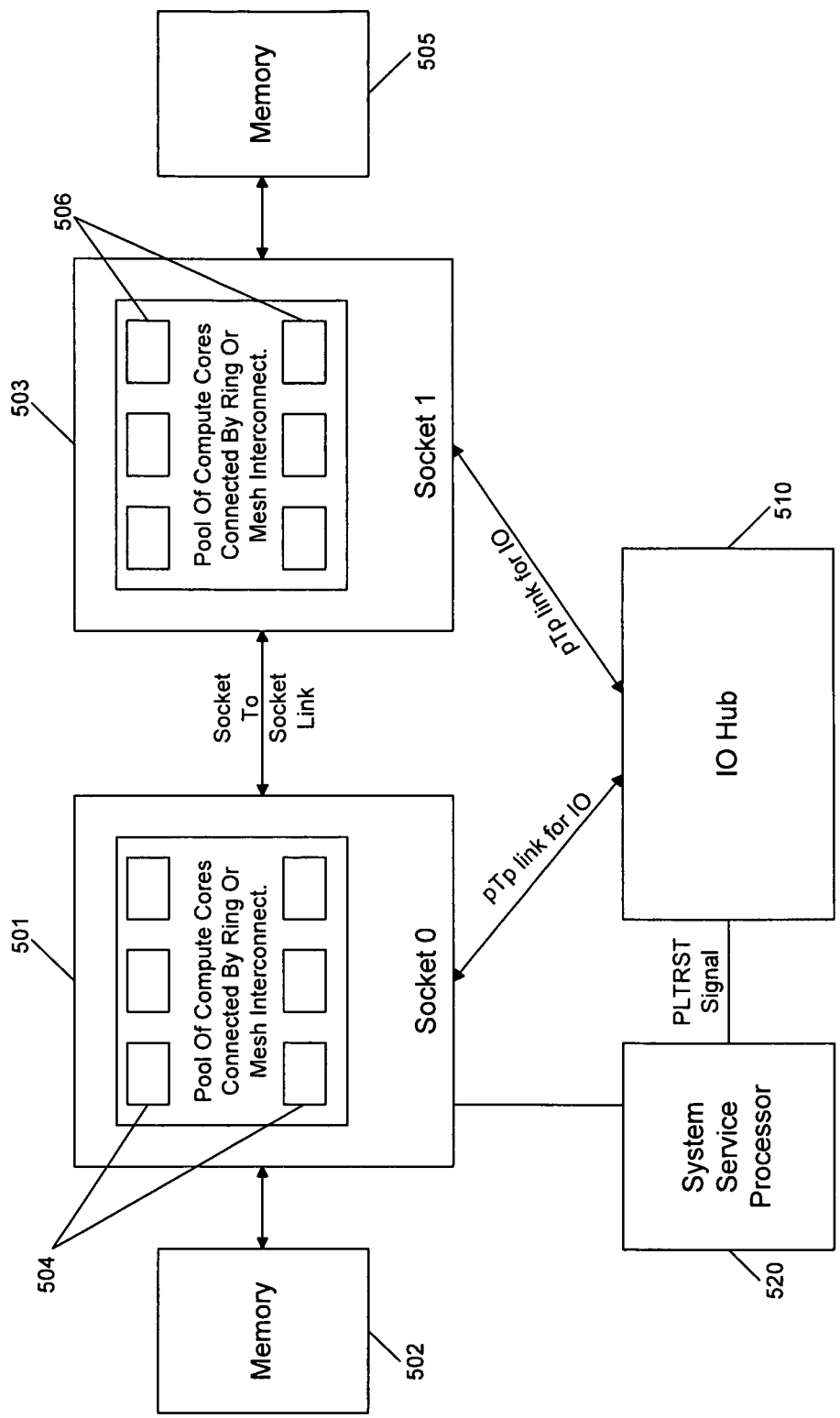
FIG. 5 is a platform architecture in accordance with an embodiment of the invention.

FIG. 5 is a platform architecture in accordance with an embodiment of the invention. In this embodiment, sockets 501 and 503 include a plurality of processor cores, 504 and 506, respectively. In this embodiment, each socket may utilize sub-socket partitioning, such that, each socket is running a different operating system with the respective processor cores. In one embodiment, each socket is coupled to a memory. For example, socket 501 is coupled to memory 502 and socket 506 is coupled to memory 505. Also, the sockets 501 and 502 are coupled via a link. In one embodiment, the link is a Quickpath link that adheres to the Intel Corporation specification for System Interconnect for Quickpath. In one embodiment, the sockets are coupled to the input/output hub (IOH) 510 via a point to point (pTp) link. Also, a system service processor 520 is coupled to socket 501.

In one embodiment, a firmware designated as Active Partition Management (APM) that is an Extensible Firmware Interface (EFI) runtime module is responsible for overall system configuration during boot, core and memory allocation and de-allocation during run time, and error flow and RAS (Reliability, Accessibility and Serviceability) management for shared resources during runtime. In one embodiment, this firmware is accessed via EFI calls by the OS/VMM of different partitions.

Figure 6:
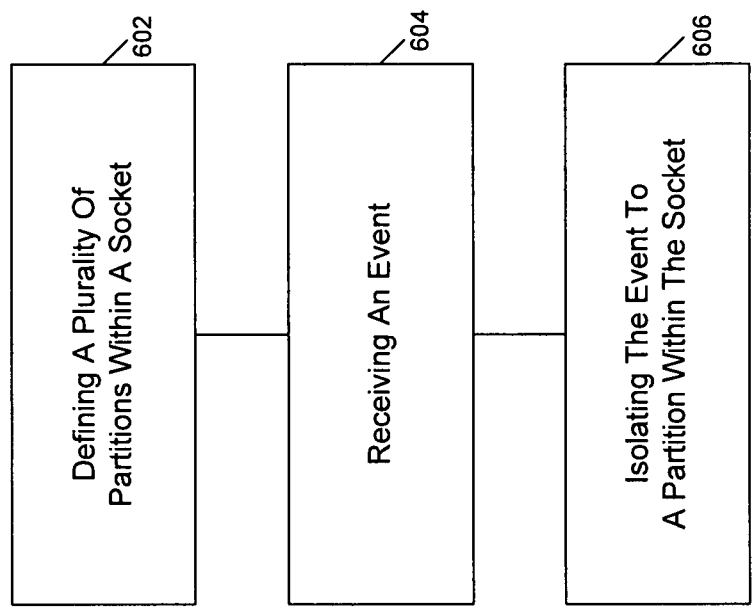
FIG. 6 is a method of a flowchart in accordance with an embodiment of the invention.

FIG. 6 is a method of a flowchart in accordance with an embodiment of the invention. In this embodiment, defining a plurality of partitions within a socket, as block 602 indicates, allows each partition within the socket to run a different operating system. Subsequently, the socket or the plurality of sockets receives an event, as block 604 indicates, that may impact the socket or plurality of sockets within the system. The event could be, but not limited to, a reset, interrupts, errors, and reliability, availability, and serviceability (RAS) management. Subsequently, to facilitate proper handling of the event, the claimed subject matter facilitates isolating the event to a partition within the socket, as indicated by block 606. The following paragraphs and pages discuss the different types of events and the isolation techniques utilized for each event.

In one embodiment, the event is a reset that impacts multiple partitions. In the following, three methods of partition specific reset are discussed wherein each core within the socket has an enable bit and all shared resources, such as, input/output hubs (IOH), input/output controllers (ICH), and PCI Express resources have a common reset enable bit.

For a first embodiment for a partition specific reset, a system service processor (SSP) initiates a reset by setting the reset enable bit of appropriate resources and then asserting global system reset. In one embodiment, the cores and input/output resources assigned to the partition are quiesced so that the Quickpath fabric does not live lock or dead lock, before asserting such a reset.

For a second embodiment for a partition specific reset, software in a partition initiates a partition specific reset by writing into a register in the ICH. In one embodiment, the register is a reset register (CF9 or equivalent). In the case of shared ICH, this write is trapped in the IOH and sent to a reset request register in the ICH which is unique for each partition. As a result of this register write, the ICH asserts one of the platform reset wires connected to the SSP. Each Platform Reset wire maps to a particular partition. The SSP initiates the reset for the appropriate partition as discussed in the previous embodiment for a partition specific reset (in the previous paragraph). For partitions with special privileges, this method can be used to initiate a reset of another partition in the system.

For a third embodiment for a partition specific reset, the IOH has the ability to drive the reset wires to the socket and to the IO devices in systems that do not have a SSP. In this embodiment, there is a reset request register in the IOH for each partition. The partition initiates a partition specific reset request by writing into this register. Consequently, resulting in an SMI request to the partition and the APM will be called to program the appropriate reset enables and quiesce the partition and then the APM will write into the platform reset request register in the IOH. Consequently, the IOH asserts a global platform reset and then reset all the resources in itself for which the reset enable bit is set.

In one embodiment, the event is an interrupt, such as, but not limited to, MSI interrupts, inter processor interrupts (IPI), virtual legacy wires based interrupts, and legacy interrupts. In one embodiment, MSI is a message signaled interrupt, as defined in PCIe terminology, for interrupts that reach the processor inside a message packet or message bus transaction instead of being sent through pins.

In the first embodiment for partition specific interrupt handling, an interrupt that is a MSI interrupt that is a memory write, the interrupt request is mapped to one or more Advanced programmable interrupt controller (APICs) in the desired destination partition based on the requestor ID and the addressing mode [logical or physical]. For this the MSI is converted into an IntLogical or IntPhysical message directed to the destination partition's interrupt handling unit (by means of the node id or partition id bits). For this the IOH will have a {MSI-requestor ID, MSI addressing mode, MSI address}-{Quickpath node id, (optional) partition id, APIC ID} mapping table. This can be used for IO devices that are shared between partitions or for IO devices that are used by only one partition. In one embodiment, the message types IntLogical or IntPhysical adhere to the Intel Quickpath specification. However, the claimed subject matter is not limited to a message type defined by Quickpath; In contrast, one skilled in the art appreciates utilizing different message types for their respective interrupt handling unit. For IntLogical messages, the logical IDs of APICs in different partitions in the socket can be the same. So in logical addressing mode, the Partition ID bits or partition specific Node ID is used to differentiate between interrupts to different partitions.

In the second embodiment for partition specific handling of a Legacy interrupt, each partition has a IO advanced programmable interrupt controller (IO×APIC). In one aspect, the IO×APIC is a system interrupt controller and it receives interrupts from different sources in the system and sends interrupt messages appropriately to the processor core. In one embodiment, the IO×APIC resource could be in the same ICH/ESB (Embedded South Bridge) with all the registers replicated for each partition. Alternatively, in another embodiment, the resource could be in separate ICH/ESBs for each partition.

Input/output (IO) devices that utilize Legacy INTx signals can be shared or belonging to a single partition and the signaling could be through actual pins or through Virtual wire messages. In the embodiment of virtual wire messages, based on the requestor ID, the message is routed to the appropriate partition's IO×APIC. If the destination IO×APIC is shared, then the message packet will have partition id in it so that it can be delivered to the appropriate IO×APIC resource.

In the embodiment of Pin based interrupt signaling, such as, but not limited to, PIRQ and IRQ, wherein PIRQ is an PCI interrupt request and IRQ is a legacy interrupt request, there is a mapping table in the ICH/ESB/legacy bridge that routes it to the appropriate partition's IO×APIC resources.

In the third embodiment for partition specific interrupt handling, a virtual legacy wires based interrupt, the legacy interrupts and other signals to the processors can be sent to a specific partition. For example, this could be accomplished by using the Partition ID or partition specific Node ID in the corresponding VLW packet. The IOH maintains a participant partition list for each Legacy wire and sends the very long word (VLW) packet only to the participant partitions interrupt handling block.

In the fourth embodiment for partition specific interrupt handling, an IPI interrupt, the first example is the IPI interrupt is sent from one processor core to another processor core. However, the receiving core may be on the same or a different socket. In the case of the first level interconnect where custom messages can be sent, the partition ID can be send as part of the IPI message. Each core on the first level interconnect checks if the partition ID field is equal to its Partition ID. If so, it checks the APIC ID in the IPI message and if the APIC ID matches, accepts the IPI. In case of a broadcast IPI, only those cores whose Partition ID matches the IPI message accepts the IPI. Otherwise, in case the IPI goes out of the socket, it is routed to the Interrupt handling logic which converts the message to a Quickpath based IntPhysical or IntLogical CSI message. The Interrupt box will have a mapping table with the {Partition ID, APIC ID} mapping so that it can prevent messages from one partitions from reaching a different partition. The addressing can be Logical or Physical. In the logical addressing mode, the logical IDs of APICs in different partitions in the socket can be the same. So in logical addressing mode, the Partition ID bits or partition specific Node ID is used to differentiate between interrupts to different partitions.

In one embodiment, the event is an error condition. In some examples, the error condition is isolated to a partition. In contrast, other examples have error conditions that are notified to the entire system.

In one embodiment, the partition-core table maintained in the interrupt logic can be used to limit the distribution of error signals to the cores in a particular partition alone, when partition specific error interrupt occurs.

One example of an error condition that is isolated to a partition is a non fatal error, such as, a single bit error in read data for a memory read transaction. This can be isolated to a transaction and it can be isolated to a partition, provided that the Partition ID or partition specific Node ID of requestor of the transaction is available at the block which detected the error. For partition isolation, each block sends a Partition ID along with the error event pulse to the interrupt logic in the socket for these cases.

One example of an error condition that is not isolated to a partition is a fatal error such as, control structure parity errors or persistent link errors. These cannot be isolated to a specific transaction and hence this error event is sent to all partitions by setting the Partition ID bits to all ones for this type of error event pulse to the interrupt logic.

In one embodiment, the event is a reliability, availability, and serviceability (RAS) management. In one embodiment, RAS system management is performed by the hardware modules and coordinated by the APM. Depending on the level of RAS functionality needed, the RAS may be controlled either dynamically or statically at boot up.

For the embodiment of static control, the granularity of implementation is performed at the device level. For example, Memory RAS would have to be done at Memory Controller level so that individual Memory controllers can be configured to either have or not have Mirroring or Sparing for their respective DIMMs. Hence none of the Partitioned OS/IVMM will be aware of the Memory RAS features. Memory scrubbing of memory space belonging too can be done in a Partition unaware fashion.

In case advanced features like dynamic core sparing is required, the APM is responsible for execution of RAS flows for resources shared by all the partitions. Partition specific RAS actions are provided in addition to system RAS actions. The co-ordination of RAS requests from various partitions is done by the APM firmware. For example, a partition OS/VMM can request for a migration of its portion of populated memory on a memory controller to another memory controller which has memory allocated to it in equal or greater amount. Cache scrubbing of cache blocks belonging to a partition is provided. For example, it can scrub the entire memory even if only a single partition requested for scrubbing or it can scrub only the requesting partition's portion of the memory space.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising: defining a plurality of partitions, within a processor socket including, configured on a die, a plurality of cores, a memory controller, a first level ring interconnect to interconnect the plurality of cores with a distributed last level cache (LLC), a fabric interface, a home agent coupled to the memory controller, and a second level interconnect to interconnect the home agent and the fabric interface for sub-socket partitioning; receiving an event, wherein the event is a reset, interrupt, error, or reliability, availability, and serviceability (RAS) condition, wherein the reset is a partition specific reset of a specific partition; and isolating the event to a partition within the processor socket.

2. The method of claim 1 wherein the partition specific reset is caused by a system service processor (SSP) coupled to the processor socket.

3. The method of claim 2 wherein the partition specific reset is performed by the SSP by first setting a reset enable bit of an impacted shared resource and then asserting a global system reset, wherein the specific partition includes at least one core and at least one input/output resource that are quiesced before asserting the global system reset.

4. The method of claim 2 wherein the partition specific reset is performed by software in a first partition initiating a write operation into a register into an input/output controller (ICH), wherein the write operation is trapped and sent to a first unique register of the ICH for the first partition, and to cause initiation of assertion of a first platform reset wire coupled to the SSP to cause the SSP to initiate the reset for the first partition.

5. The method of claim 1 wherein the partition specific reset is performed by an input/output hub (IOH) activating a reset wire to the processor socket and to an input/output device.

6. The method of claim 1 wherein the error is classified into either a partition specific notice or a system wide notice.

7. A system comprising:
 a processor configured on a die within a socket and having a plurality of cores, a first level ring interconnect to couple the plurality of cores to a distributed last level cache (LLC), a fabric interface, a home agent coupled to a memory controller, and a second level interconnect to interconnect the home agent and the fabric interface;
 a dynamic random access memory, coupled to the socket, to receive requests from the processor;
 the processor to support sub-socket partitioning of the processor to utilize at least a first operating system and a second operating system within a first partition and a second partition;
 the processor to receive an event and to isolate the event to either the first partition or the second partition within the socket, wherein the event is a reset, interrupt, error, or reliability, availability, and serviceability (RAS) condition, wherein the reset is a partition specific reset; and
 a system service processor (SSP) coupled to the processor.

8. The system of claim 7 wherein the SSP is to facilitate the partition specific reset by first setting a reset enable bit of an impacted shared resource and then asserting a global system reset, wherein the specific partition includes at least one core and at least one input/output resource that are quiesced before asserting the global system reset.

9. The system of claim 7 further comprising an interrupt logic, coupled to the processor, to facilitate an interrupt, the interrupt logic including a mapping table to map a first tuple of a message signaled interrupt (MSI) identifier, an addressing mode, and an address to a second tuple of a node identifier, a partition identifier and an interrupt logic identifier.

10. The system of claim 9 wherein the interrupt logic is to issue the message with a partition identifier to determine whether a receiving core is in the same socket or a different socket.

11. A processor comprising: a processor socket including, on a die: a plurality of processor cores, a memory controller, a first level ring interconnect to interconnect the plurality of processor cores with a distributed last level cache (LLC), a fabric interface, a home agent coupled to a memory controller, and a second level interconnect to interconnect the home agent and the fabric interface, wherein the plurality of processor cores support sub-socket partitioning that allows a plurality of partitions within the processor socket, each of the partitions to execute a different operating system; the processor to receive an event comprising a reset, interrupt, error, or reliability, availability, and serviceability (RAS) condition, wherein the reset is a partition specific reset of a specific partition; and wherein an interrupt logic is coupled to the processor, to facilitate handling of the interrupt by isolating the interrupt to a partition of the plurality of partitions based at least in part on information in a mapping table of the interrupt logic.

12. The processor of claim 11 wherein the interrupt logic is to issue a message with a partition identifier to determine whether a receiving core is in the processor socket or a second processor socket.

13. The processor of claim 11 wherein the interrupt logic is to facilitate the interrupt.

\* \* \* \* \*